(12) United States Patent
Bai et al.

(10) Patent No.: US 12,763,811 B2
(45) Date of Patent: Oct. 13, 2026

(54) CIRCUITRY ON ANTENNA MODULE, ANTENNA MODULE, AND SYSTEM COMPRISING THE SAME

(71) Applicant: HEWLETT PACKARD ENTERPRISE DEVELOPMENT LP, Spring, TX (US)

(72) Inventors: Hailong Bai, Beijing (CN); Hongli Zhang, Beijing (CN); Kuanyue Li, Beijing (CN); Jiguang Zheng, Beijing (CN)

(73) Assignee: Hewlett Packard Enterprise Development LP, Spring, TX (US)

(*) Notice: Subject to any disclaimer, the term of this patent is extended or adjusted under 35 U.S.C. 154(b) by 309 days.

(21) Appl. No.: 18/427,491

(22) Filed: Jan. 30, 2024

(65) Prior Publication Data

US 2025/0247124 A1 Jul. 31, 2025

(51) Int. Cl.
*H04B 1/44* (2006.01)
*H01Q 1/50* (2006.01)

(52) U.S. Cl.
CPC ................ *H04B 1/44* (2013.01); *H01Q 1/50* (2013.01)

(58) Field of Classification Search
CPC .................................. H01Q 1/50; H04B 1/44
See application file for complete search history.

(56) References Cited

U.S. PATENT DOCUMENTS

2002/0098613 A1* 7/2002 Loo .................... H01H 59/0009 438/73
2003/0176176 A1* 9/2003 Leinonen ................ H04B 7/12 455/73
2010/0090777 A1* 4/2010 Song ...................... H01Q 21/28 333/101
2013/0122824 A1* 5/2013 Schell .................. H04B 1/0064 455/73
2022/0224385 A1* 7/2022 Kotilainen .............. G01S 1/042
2024/0255606 A1 8/2024 Zheng et al.

FOREIGN PATENT DOCUMENTS

WO WO-2013131230 A1 * 9/2013 .............. H01Q 3/24

* cited by examiner

*Primary Examiner* — Kashif Siddiqui
(74) *Attorney, Agent, or Firm* — Hewlett Packard Enterprise Patent Department

(57) ABSTRACT

Implementations of the present disclosure relate to circuitry for automatically correcting wrong connection of an antenna to a radio frequency (RF) cable. The circuitry comprises a first single pole double throw (SPDT) switch and a second SPDT switch. The input pole of the first SPDT switch is connected to a first antenna connection line while the input pole of the second SPDT is connected to a second antenna connection line. The first antenna connection line is connected to one of a first RF cable and a second RF cable, while the second antenna connection line is connected to the other of the first RF cable and the second RF cable. The throw, to which the input pole of the first or second SPDT switch is connected, can be changed based on the RF cable to which the input pole is connected. Therefore, the RF cable can be connected to the corrected output to correct the wrong connection automatically regardless of the antenna to which the RF cable is connected.

17 Claims, 4 Drawing Sheets

CIRCUITRY ON ANTENNA MODULE, ANTENNA MODULE, AND SYSTEM COMPRISING THE SAME

BACKGROUND

Outdoor external antennas are usually mounted on tall utility poles for better Wi-Fi signal coverage. For safety reasons, the user is required to finish the connection between the outdoor external antenna and an access point (AP) before applying the power. Each antenna is required to be mounted to a corresponding port or a corresponding radio frequency (RF) cable. If the connections are swapped with carelessness, key functions of the outdoor external antenna, such as antenna identification, auto cable loss calculation, and antenna heading, will be lost.

BRIEF DESCRIPTION OF THE DRAWINGS

Through the following detailed descriptions with reference to the accompanying drawings, the above and other objectives, features, and advantages of the example implementations disclosed herein will become more comprehensible. In the drawings, several example implementations disclosed herein will be illustrated in an example and in a non-limiting manner, where.

DETAILED DESCRIPTION

Figure 1:
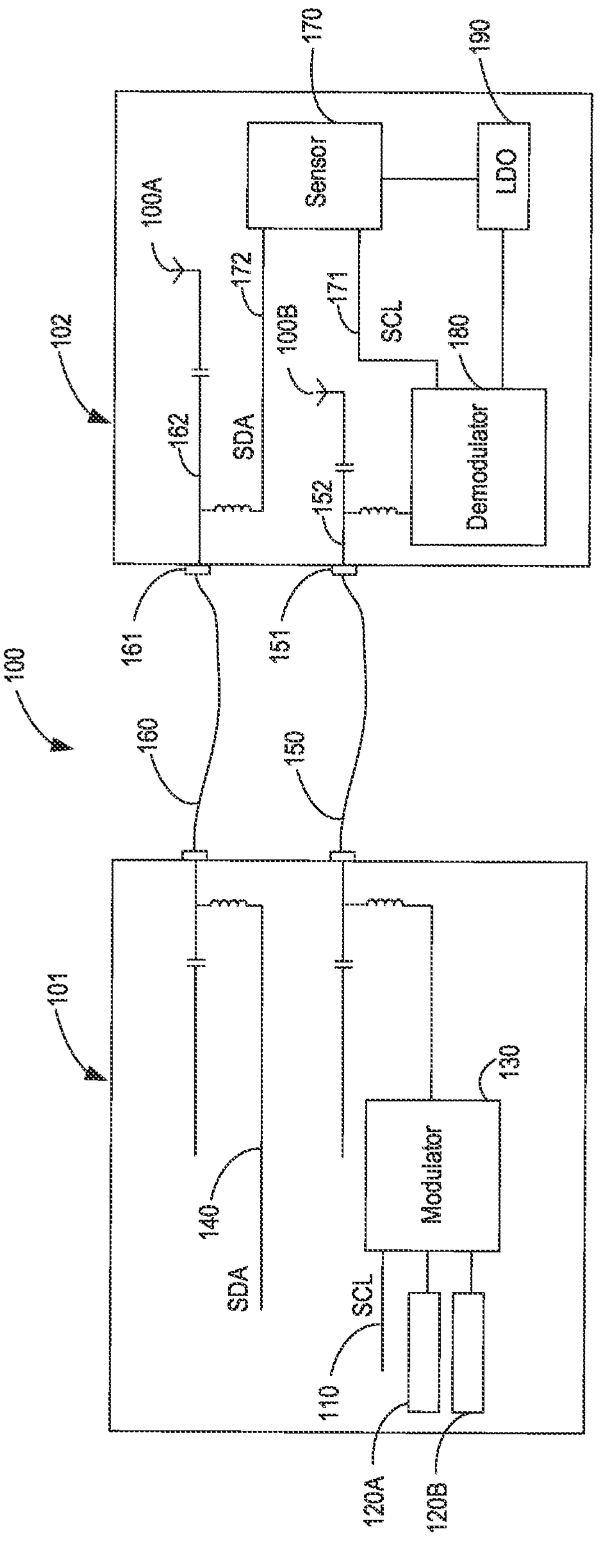
FIG. 1 illustrates a schematic diagram illustrating an example environment in which example implementations of the present disclosure may be implemented.

Traditionally, there is no power and digital interface for the sensors in the antenna module, such as digital compasses and declinometers. Thus, the sensor cannot be powered to sense the directional antenna (such as the 6 GHz antenna), and data cannot be transmitted between the 6 GHz antenna and the AP. When the digital compass or declinometer is installed on a 6 GHz antenna outdoors to sense the location, direction, coverage area, and the like of the 6 GHz antenna, the sensor needs to be supplied with electrical power so as to sense the directional 6 GHz antenna. The data sensed by the sensor should be transmitted to the AP indoors. Although the wireless communication, such as Blue Tooth, is widely used to transmit data, the wireless communication will be negative for regulatory and introduce a security risk, and cannot be used to power the sensors. It would be beneficial to transmit the data and supply the power through cables.

Generally, the outdoor device needs to withstand harsh weather and at least should be waterproof. If new dedicated cables are used to transmit the sensed data and supply power to the sensors, on the one hand, the installation process for the dedicated cable will be more complicated, and thus, the cost will be increased. On the other hand, the dedicated cable will also increase the risk of water leakage.

The RF cable is designed to transmit and receive the RF signal, which is of the frequency from 2.4 GHz to 6 GHz, between the indoor AP and the outdoor antenna. If the data sensed by the sensor and the power supplied to the sensor can be transmitted over the existing RF cables, there is no need for any dedicated cable, thereby simplifying the installation process and reducing the cost and the risk of water leakage. Thus, for example, two RF cables are used, one of the two RF cables is used to transmit the modulated power and clock signal to the outdoor external antenna, and the other of the two RF cables is used to transmit the data (for example, data transmitted via $I^2C$ interface) between the outdoor passive antenna and the indoor AP.

As described above, outdoor external antennas are usually mounted on tall utility poles for better Wi-Fi signal coverage. For safety reasons, the user is required to finish the connection between the outdoor external antenna and an access point (AP) before applying the power. Since different RF cables are used to achieve different functions, each antenna is required to be mounted to a corresponding port (for example, a port on the panel board for connecting the corresponding RF cable) or a corresponding radio frequency (RF) cable. If the connections are swapped with carelessness, key functions of the outdoor external antenna, such as antenna identification, auto cable loss calculation, and antenna heading, will be lost.

To address the problems in the typical design as discussed above, example implementations of the present disclosure propose a circuitry for automatically correcting the wrong connection of an antenna to a radio frequency (RF) cable. The circuitry comprises a first single pole double throw (SPDT) switch and a second SPDT switch. The input pole of the first SPDT switch is connected to a first antenna connection line, while the input pole of the second SPDT switch is connected to a second antenna connection line. The first antenna connection line is connected to a first antenna, one of a first RF cable, and a second RF cable, while the second antenna connection line is connected to a second antenna and the other of the first RF cable and the second RF cable. The throw, to which the input pole of the first or second SPDT switch is connected, can be changed based on the RF cable to which the input pole is connected. Therefore, the RF cable can be connected to the corrected output regardless of the antenna to which the RF cable is connected. Therefore, the wrong connection of the antenna to the RF cable or port can be corrected.

FIG. 1 is a schematic diagram illustrating an example environment in which example implementations of the present disclosure may be implemented. As illustrated in FIG. 1, the system 100 includes an AP 101 and an antenna module 102. The AP is a networking device that allows wireless-capable devices to connect to a wired network. With the development of the wireless communication technology, the AP is provided with a multiple input multiple output (MIMO) system, so as to improve the transmission rate and bandwidth utilization of information. Corresponding, the AP is provided with a plurality of front-end modules (FEMs). Communications between the AP and the wireless-capable devices may operate according to wireless communication protocols such as the Institute of Electrical and Electronic Engineers (IEEE) 802.11 standards, Wi-Fi Alliance Specifications, or any other wireless communication standards. The IEEE 802.11 standards may include the IEEE 802.11ay standard (e.g., operating at 60 GHZ), the IEEE 802.11ad standard (sometimes referred to as "WiGig"), the IEEE 802.11be (referred to as "WIFI 7") or any other wireless communication standards.

As illustrated in FIG. 1, the antenna module 102 is provided with at least one directional antenna 100A and 100B (such as a passive 6 GHz antenna) and at least one sensor 170 to sense the location, the direction, and the coverage and the like of the 6 GHz antenna. The at least one sensor 170 is required to be powered by electrical power from the AP 101. As illustrated in FIG. 1, the directional antenna 100A or 100B is, for example, a passive direction antenna that can generate information about the direction thereof. In some implementations, the directional antenna 100A or 100B may be an external 2×2 6 GHz panel antenna, including two directional antennas.

The $I^2C$ interface is usually a powerful bus used for communication between a master (or multiple masters) and a single or multiple slave device(s). The physical 12C interface consists of the serial clock (SCL) and serial data (SDA) lines. The sensor 170 is provided with an 12C interface to transmit and receive data or electrical power. Accordingly, the AP 101 is provided with a corresponding SCL line for transmitting a clock signal and a corresponding SDA line for transmitting and receiving data. As illustrated in FIG. 1, the AP 101 includes a clock line 110, such as an SCL line of the $I^2C$ interface; and a data line 140, such as an SDA line of the $I^2C$ interface. The clock line 110 is configured to transmit or generate a clock signal having alternate high power level and low power level. The clock signal may be transmitted to at least one sensor 170 provided on the antenna module 102 so as to sample the data sensed by the sensor 170. The SDA line 140 is configured to send a request to the sensor to request data sensed by the sensor 170 and then receive the sensed data from the sensor 170, such as information about the location, the direction, and the coverage area of the directional antenna 100A or 100B.

Continue to refer to FIG. 1, the AP 101 further includes a first power supply 120A and a second power supply 120B. The first power supply 120A may be a power supply for providing a high voltage, for example, 5V, and the second power supply 120B may be a power supply for providing a low voltage, for example, 4.2V.

As discussed above, there is no power supply at the passive antenna (such as a passive 6 GHz antenna). If sensors, such as digital compasses and declinometers, are provided on the passive antenna (such as the passive 6 GHz antenna) to sense the location, the direction, and the coverage of the antenna, the sensors should be supplied with electrical power to work. Further, the sensed data from the sensor 170 will be transmitted to the AP 101, and dedicated cables for transmitting the data and the clock signal may increase the risk of water leakage. Therefore, as illustrated in FIG. 1, the system 100 further includes two RF cables 150 and 160 for powering the antenna and transmitting data between the AP and the antenna to avoid the risk of water leakage.

As illustrated in FIG. 1, the AP 101 further comprises a modulator 130 connected to the clock line 110, the first power supply 120A, and the second power supply 120B so as to receive the clock signal and the power voltages. The modulator 130 is configured to modulate the clock signal and the power voltages into a single modulated power. Since the clock signal has alternate high voltage and low voltage, the modulated power has high power voltage and low power voltage alternated with each other. In some implementations, in the modulated power, the high power voltage is about 5V, and the low power voltage is about 4.2V.

As illustrated in FIG. 1, the modulated power of high voltage (for example, 5V) and low voltage (for example, 4.2V) is transmitted to the antenna module 102 over a radio cable 150, for example, an RF cable for SCL, which is one of two cables designed for the 2×2 panel antenna. As illustrated in FIG. 1, the sensed data is transmitted to the AP 101 through the other radio cable 160, for example, an RF cable for SDA, which is the other of two cables designed for the 2×2 panel antenna. The RF cable is configured to transmit the radio frequency signal, typically having a frequency from 2.4 GHz to 6 GHz. Meanwhile, the clock signal typically has a frequency from 50 KHz to 500 kHz, which is much less than that of the RF signal. Since the RF choke can provide good isolation between $I^2C$ and RF signals, there is no interference between the modulated power and the RF signal.

The modulated power is transmitted to the antenna module 102 over the radio cable 150 so as to power the sensor 170. Since the modulated power cannot be used as the clock signal for the sensed data of the sensor 170, as illustrated in FIG. 1, the antenna module 102 further includes a demodulator 180 connected to the radio cable 150 and configured to receive and demodulate the modulated power into a demodulated clock signal. The demodulated power has the same frequency or duty cycle as the clock signal, and thus reproduces the clock signal to a large extent. The demodulated clock signal is then received by the sensor 170 so as to sample the sensed data. In some implementations, the output of the demodulator 180 should be an open drain or collector to comply with the $I^2C$ specification.

The sensor 170 is further powered by the modulated power so as to sense the location, direction, coverage, and the like of the 6 GHz antenna. As illustrated in FIG. 1, the antenna module 102 is further provided with a Low Dropout Regulator (LDO) 190 configured to receive the modulated power and transform the alternate high voltage and low voltage to a constant voltage, for example, 3.3V, which is to be supplied to the sensor 170 to power it.

By the system 100 as illustrated in FIG. 1, it is possible to deploy compass/declinometer sensors on a 6 GHz panel antenna for AFC requirement and RF visualizations, so as to obtain the location, the direction and the coverage area and the like of the 6 GHz antenna. Further, by providing the modulator in the AP and the demodulator in the antenna module, the desired signal (such as a clock signal) and the power voltage can be modulated at the modulator into a single modulated power. The single modulated power can be transmitted to the antenna module over one single RF cable, and then the modulated power received from one single RF cable can be demodulated at the demodulator to a clock signal. Thus, a single existing RF cable, which is designed to transmit the RF signal, can be used to transmit a modulated power, and there is no necessity to provide a dedicated cable to transmit the clock signal and another dedicated cable to supply the power voltage to the sensor. Therefore, the installation process can be simplified, the cost can be significantly reduced, and the risk of water leakage can be reduced.

The antenna module 102 is usually mounted on tall utility poles for better Wi-Fi signal coverage. For safety reasons, the user is required to finish the connection between the outdoor external antenna module 102 and the AP 101 before applying the power. For example, the user is required to climb up the tall utility poles to install the RF cable 150 for SCL to a first port 151 on the antenna module 102 and the RF cable 160 for SDA to a second port 161 on the antenna module 102. The first port 151 is connected to a first connection line 152, which is a line for connecting with a clock line 171 of the sensor 170, and the second port 161 is connected to a second connection line 162, which is a line for connecting with a data line 172 of the sensor 170.

After installing the RF cables to the respective ports, the AP may be powered, and then the sensor on the antenna module 102 can be powered by the LDO 190 to work. If the user carelessly installs the RF cable 150 to the second port 161, the modulated clock single is transmitted to the data line 172 of the sensor 170 and thus cannot be demodulated by the demodulator 180 to a clock signal, and the sensor 170 cannot be powered by the power from the LDO 190. If the RF cable 160 is installed to the first port 151, the data is transmitted to the demodulator 180, the data from the AP 101 cannot reach the sensor 170, and the data from the sensor 170 cannot also reach the AP 101. Therefore, the key functions of the outdoor external antenna, such as antenna identification, auto cable loss calculation, and antenna heading, cannot be achieved. Typically, in order to correct the wrong connection, the user has to climb up the tall utility poles again to switch the connections of the two RF cables, thereby causing a waste of labor costs, the resulting operational inconvenience, and the high costs of installation.

Figure 2A:
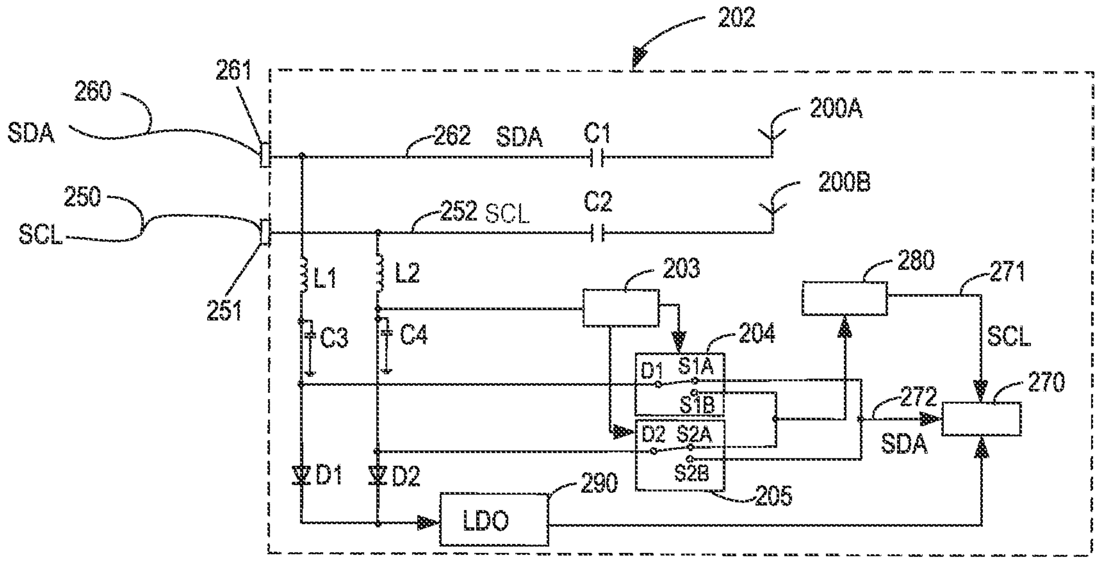
FIG. 2A illustrates a block diagram of a circuitry for auto-correction on the external antenna in accordance with some example implementations of the present disclosure.
Figure 2B:
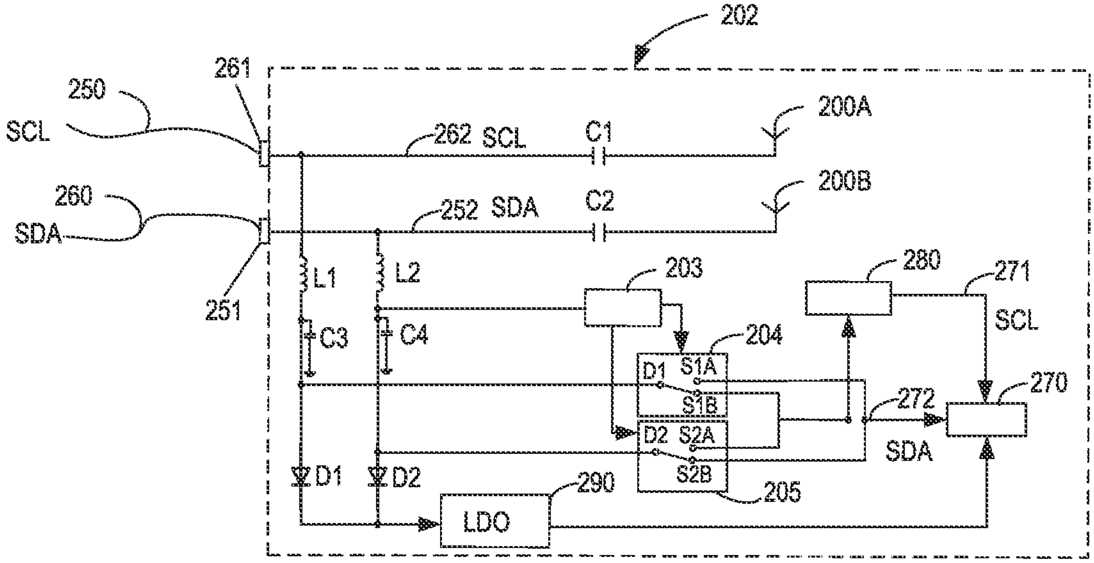
FIG. 2B illustrates a block diagram of a circuitry for auto-correction on the external antenna in accordance with some example implementations of the present disclosure.

FIG. 2A and FIG. 2B illustrate a block diagram of a circuitry for auto-correction on the external antenna in accordance with some example implementations of the present disclosure. As illustrated in FIG. 2A and FIG. 2B, the antenna module 202 corresponds to the antenna module 102 of FIG. 1, the cable 260 corresponds to the cable 160 of FIG. 1, the cable 250 corresponds to the cable 150 of FIG. 1, the port 261 corresponds to the port 161 of FIG. 1, the port 251 corresponds to the port 151 of FIG. 1, the antenna 200A or 200B corresponds to the antenna 100A or 100B of FIG. 1, the line 262 corresponds to the line 162 of FIG. 1, the line 252 corresponds to the line 152 of FIG. 1, the modulator 280 corresponds to the modulator 180 of FIG. 1, the sensor 270 corresponds to the sensor 170 of FIG. 1, the LDO 290 corresponds to the LDO 190 of FIG. 1, the line 272 corresponds to the line 172 of FIG. 1, and the line 271 corresponds to the line 171 of FIG. 1.

As illustrated in FIG. 2, a circuitry for auto-correction is provided on the antenna module 202. The circuitry includes a first antenna connection line 262 connected to a first antenna 200A, one of a first RF cable, and a second RF cable. The circuitry further includes a second antenna connection line 252 connected to a second antenna 200B and the other of the first RF cable and the second RF cable. In some implementations, as illustrated in FIG. 2A, the first antenna connection line 262 is connected to the RF cable 260 for SDA, and the second antenna connection line 252 is connected to the RF cable 250 for SCL. In some implementations, as illustrated in FIG. 2B, the first antenna connection line 262 is connected to the RF cable 250 for SCL, and the second antenna connection line 252 is connected to the RF cable 260 for SDA. That is to say, the first antenna connection line 262 may be connected to any of the RF cable for SDA and the RF cable for SCL.

As illustrated in FIGS. 2A and 2B, the circuitry further includes a first single pole double throw (SPDT) switch 204. In some implementations, the SPDT switch 204 includes a first input pole D1 connected to the first antenna connection line 262, a first throw S1A, and a second throw S1B. The first throw S1A and the second throw S1B are connected to different components. In some implementations, as illustrated in FIGS. 2A and 2B, the first throw S1A is connected to the sensor 270 via the line 272 for SDA, and the second throw S1B is connected to the demodulator 280, and then the demodulated clock signal is transmitted from the demodulator 280 to the sensor 270 via the line 271 for SCL.

As illustrated in FIGS. 2A and 2B, the circuitry further includes a second single pole double throw (SPDT) switch 204. In some implementations, the SPDT switch 205 includes a second input pole D2 connected to the second antenna connection line 252, a third throw S2A, and a fourth throw S2B. The third throw S2A and the fourth throw S2B are connected to different components. In some implementations, as illustrated in FIGS. 2A and 2B, the third throw S2A is connected to the demodulator 280, and then the demodulated clock signal is transmitted from the demodulator 280 to the sensor 270 via the line 271 for SCL, and the fourth throw S2B is connected to the sensor 270 via the line 272 for SDA.

In some implementations, based on the cable to which the first antenna connection line 262 is connected, the first input pole D1 of the SPDT switch 204 may be connected to a respective one of the first throw S1A and the second throw S1B, and the second input pole D2 of the SPDT switch 205 may be connected to a respective one of the third throw S2A and the second throw S2B.

In some implementations, as illustrated in FIG. 2A and FIG. 2B, the first input pole D1 is configured to be connected to the first throw S1A upon determining that the first antenna connection line 262 is connected to the RF cable 260 for SDA, and configured to be connected to the second throw S1B upon determining that the first antenna connection line 262 is connected to the second RF cable 250 for SCL.

In some implementations, as illustrated in FIG. 2A and FIG. 2B, the second input pole D2 is configured to be connected to the first throw S2A upon determining that the first antenna connection line 262 is connected to the RF cable 260 for SDA, and configured to be connected to the second throw S2B upon determining that the first antenna connection line 262 is connected to the second RF cable 250 for SCL.

Therefore, upon determining that first antenna connection line 262 is connected to the RF cable 260 for SDA, the SDA data from the RF cable 260 may be transmitted to the sensor 270 via the first throw S1A, and the SCL data from the RF cable 250 may be transmitted to the demodulator 280 via the third throw S2A. Upon determining that the first antenna connection line 262 is connected to the RF cable 250 for SCL, the SDA data from the RF cable 260 may be transmitted to the sensor 270 via the fourth throw S2B, and the SCL data from the RF cable 250 may be transmitted to the demodulator 280 via the second throw S1B.

In some implementations, the determining may be achieved by a switch controller 203. As illustrated in FIG. 2A and FIG. 2B, the SPDT switch 204 and the SPDT switch 205 are controlled by a same switch controller 203, and the switch controller 203 is connected to the antenna connection line 252 via the inductor L2 so as to sense the connection of the antenna connection line 252 and the RF cable 250 or 26, and then output a control single to control the SPDT switch 204 and the SPDT switch 205. In some implementations, the switch controller 203 may sense that the antenna connection line 252 is connected to an SCL RF cable 250 when sensing a high voltage, and the switch controller 203 may sense that the antenna connection line 252 is connected to an SDA RF cable 260 when sensing a low voltage, since the voltage carried by the RF cable 250 is different from that carried by the RF cable 260.

As illustrated in FIG. 2A and FIG. 2B, in the case that the cable 250 is configured to transmit SCL related signal, and the RF cable 260 is configured to transmit SDA related signal, the first throw S1A and the fourth throw S2B are connected to the sensor 270 to transit SDA related signal, and the second throw S1B and the third throw S2A are connected to the demodulator 280 to transmit the SCL related signal. However, it should be understood that if the RF cable 250 is configured to receive SDA related signal from the AP and the RF cable 260 is configured to receive SCL related signal from the AP, the first throw S1A and the fourth throw S2B are connected to the demodulator 280, and the second throw S1B and the third throw S2A are connected to the sensor 270.

That is to say, the first throw S1A and the third throw S1A work simultaneously, and the second throw S1B and the fourth throw S2B work simultaneously. Regardless of the cable connected to the first or second antenna connection line, the respective SDA signal and SCL signal can transmitted to the sensor 270 and the demodulator 280, respectively. Thus, regardless of the antenna to which the RF cable is connected, the RF cable can be connected to corrected output such that the signals from the AP can be transmitted to the corresponding correct components on the antenna module, thereby automatically correcting the wrong connection of the antenna to the RF cable.

In some implementations, as illustrated in FIG. 2A and FIG. 2B, the port 261 is connected to the first antenna 200A via a capacitor C1, and the port 251 is connected to the second antenna 200B via a capacitor C2. In some implementations, the capacitors C1 and C2 may be RF coupling capacitors such that the RF signals can pass there through to feed the antenna elements. In some implementations, as illustrated in FIG. 2A and FIG. 2B, the antenna connection line 262 is connected to LDO 290 via an inductor L1 and a diode D1, and the antenna connection line 252 is connected to the LDO via an inductor L2 and a diode D2. In some implementations, the inductor L1 and the inductor L2 may be RF chokes such that the RF signal cannot pass there through to split power and the digital signals (for example, modulated SCL signal and SDA data) from the RF cables, such that the power and the digital signals can pass through the inductor L1 and the inductor L2 whereas the RF signal cannot pass therethrough. In some implementations, the diode D1 and the diode D2 may be Schottky diodes to feed the LDO 290 and prevent reverse voltage and current to the SDA lines. In some implementations, as illustrated in FIG. 2A and FIG. 2B, the inductor L1 and the inductor L2 are also connected to the ground via a capacitor C3 and a capacitor C4, respectively, such that some low-frequency noise can be removed from the signal pass through the inductor L1 and the inductor L2.

In some implementations, as illustrated in FIG. 2A and FIG. 2B, since the SDA signal from AP to the antenna module or from the antenna module to the AP will pass through the SPDT switch 204 and the SPDT switch 205, the input pole and the throws of the SPDT switch may pass bidirectional analog and digital signals such that the SDA signal can pass therethrough. In some implementations, the SPDT switch 204 and the SPDT switch 205 are powered by 3.3V, and since the modulated power of high voltage (for example, 5V) and low voltage (for example, 4.2V) may pass through the SPDT switch 204 and the SPDT switch 205, the SPDT switch 204 and the SPDT switch 205 may support the signals beyond the power supply of 3.3V to avoid a boost circuit for providing power higher than the power supply. For example, the SPDT switch 204 and the SPDT switch 205 may support at least 5V rating. In some implementations, the signaling path for SPDT switch 204 may be well isolated from the signaling path for SPDT switch 205. For example, the input pole D1 of the SPDT switch 204 is well isolated from the input pole D2 of the SPDT switch 205, the throw S1A is well isolated from the throw S2A, and the throw S1B is well isolated from the throw S2B. Further, in some implementations, the SPDT switch 204 and the SPDT switch 205 may be located at a same chip to facilitate the wiring and save space.

As described above, when the antenna connection line 252 is connected to the SCL RF cable 250, the modulated power is input to the antenna connection line 252; and when the antenna connection line 252 is connected to the SDA RF cable 260, the voltage for SDA signal is input to the antenna connection line 252. Therefore, by sensing the voltage inputted to the antenna connection line 252, the switch controller 203 may sense the cable to which the antenna connection line 252 is connected. That is to say, the switch controller 203 may control the first SPDT switch 204 and the second SPDT switch 205 such that upon determining that the cable to which the first antenna connection line 262 is connected changes, the switch controller 203 controls to change a respective throw to which the first input pole is connected, and a respective throw to which the second input pole is connected. In some implementations, the switch controller 203 is achieved by a comparator.

Figure 3:
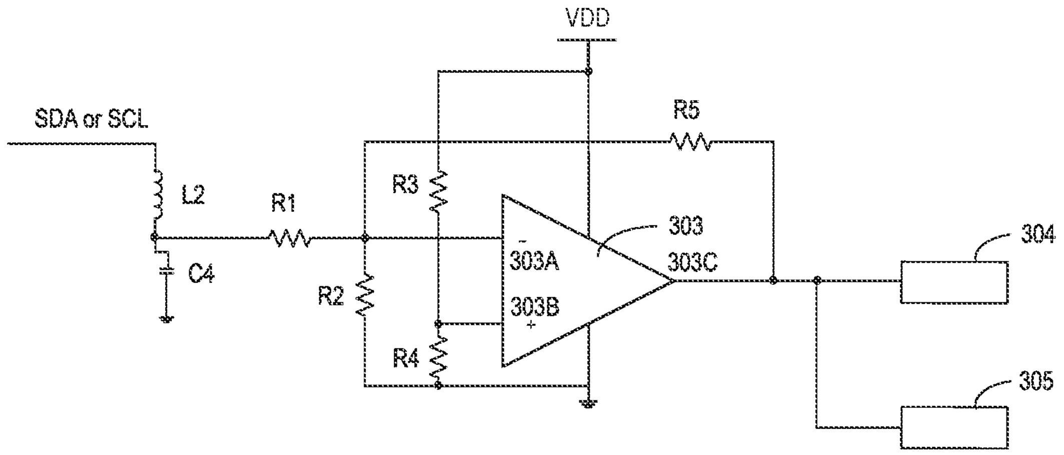
FIG. 3 illustrates an exemplary circuitry for a switch controller on the external antenna in accordance with some example implementations of the present disclosure.

FIG. 3 illustrates an exemplary circuitry for a switch controller on the external antenna in accordance with some example implementations of the present disclosure, in which the switch controller 303 corresponds to switch controller 203 of FIG. 2, the SPDT switch 304 corresponds to SPDT switch 204 of FIG. 2, and the SPDT switch 305 corresponds to SPDT switch 205 of FIG. 2.

As illustrated in FIG. 3, the comparator 303 includes a first input terminal 303A for receiving the input voltage, a second input terminal 303B for receiving the reference voltage, and an output terminal 303C connected to the SPDT switch 304 and the SPDT switch 305 to control them. By outputting different signals to the SPDT switch 304, the input pole D1 of SPDT switch 304 may be controlled to connect to the throw S1A or the S1B selectively, and by outputting different signals to the SPDT switch 305, the input pole D2 of SPDT switch 305 may be controlled to connect to the throw S2A or the S2B selectively.

In some implementations, the voltage for modulated power may be in the range of 4.2V to 5V, and the voltage for the SDA signal may be in the range of 0V to 3V. As illustrated in FIG. 3, by setting the values for the resistances R3 and R4, when the antenna connection line is connected to the SCL RF cable, voltage inputted to the first input terminal 303A may swing from 2.1V to 2.5V, and when the antenna connection line is connected to the SDA RF cable, voltage inputted to the first input terminal 303A may swing from 0V to 1.5V. In some implementations, the value of resistor R1 may be 33 KΩ, and the value of resistor R2 may be 33 KΩ. In some implementations, the $I^2C$ SDA signal is a resistor pull-up signal, and the signal is pulled up by a resistor (not shown, for example, having a resistance value of about 1.5 KΩ). Since the value for resistor R1 and resistor R2 may be 33 KΩ, which is much larger than 1.5 KΩ, the $I^2C$ SDA signal will not be pulled down by the resistor R1 and the resistor R2, and in this way, the high-level voltage for the $I^2C$ SDA signal may be ensured to be around 3V. In some implementations, the resistor R5 works with the resistor R1 to set the hysteresis of the comparator 303.

As illustrated in FIG. 3, the reference voltage for the second input terminal 303B is achieved by setting the values for resistances R3, R4, and a power supply VDD, such that the reference voltage may be about 1.7V. In some implementations, the value for resistor R3 may be 1 KΩ, and the value for resistor R4 may be 1.2 KΩ, and the power supply VDD may be 3.3V, such that the reference voltage may be about 1.7V. When the antenna connection line is connected to the SCL RF cable, the voltage of 2.1V to 2.5V input to the first input terminal 303A is higher than the reference voltage 1.7V, and the output terminal 303C may output a low-level signal. When the antenna connection line is connected to the SDA RF cable, voltage of 0V to 1.5V inputted to the first input terminal 303A is lower than the reference voltage 1.7V, and the output terminal 303C may output a high-level signal.

By receiving different output signals from the output terminal 303C, the input pole D1 of SPDT switch 304 may be connected to the throw S1A or the S1B selectively, and the input pole D2 of the SPDT switch 305 may be connected to the throw S2A or the S2B selectively. Therefore, the input pole of the SPDT may be connected to a different throw depending on the RF cable to which the antenna connection line 252 is connected, and then the modulated power can always be transmitted to the demodulator, and the SDA signal can always be transmitted to the sensor regardless of the connection of the RF cables to the antenna module. Therefore, the wrong connection of the RF cables to the antenna module can be automatically corrected by connecting the input pole of the SPDT switch to a different throw according to the connection of the RF cables, and there is no need for the operator to know the correct ports to be connected for the respective RF cables, and the operator may install the RF cable into any port.

In the context of this disclosure, while operations are depicted in a particular order, this should not be understood as requiring that such operations be performed in the particular order shown or in sequential order or that all illustrated operations be performed to achieve desirable results. In certain circumstances, multitasking and parallel processing may be advantageous. Certain features that are described in the context of separate implementations may also be implemented in combination in a single implementation. Conversely, various features that are described in the context of a single implementation may also be implemented in multiple implementations separately or in any suitable subcombination.

In the foregoing Detailed Description of the present disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the present disclosure.

What is claimed is:

1. A circuitry, comprising:

a first antenna connection line connected to a first antenna and one of a first radio frequency (RF) cable and a second RF cable;

a second antenna connection line connected to a second antenna and the other of the first RF cable and the second RF cable;

a first single pole double throw (SPDT) switch comprising a first input pole connected to the first antenna connection line, a first throw, and a second throw, wherein the first input pole is configured to be connected to the first throw upon determining that the first antenna connection line is connected to the first RF cable, and configured to be connected to the second throw upon determining that the first antenna connection line is connected to the second RF cable; and a second SPDT switch comprising a second input pole connected to the second antenna connection line, a third throw, and a fourth throw, wherein the second input pole is configured to be connected to the third throw upon determining that the second antenna connection line is connected to the second RF cable, and configured to be connected to the fourth throw upon determining that the second antenna connection line is connected to the first RF cable;

wherein the first RF cable and the second RF cable are connected between an access point and an antenna module, and the antenna module comprises the circuitry, and the antenna module further comprises:

the first antenna;

the second antenna;

a demodulator configured to demodulate a modulated power from the access point into a demodulated clock signal; and a sensor configured to receive the demodulated clock signal to sense the first antenna and the second antenna.

2. The circuitry of claim 1, wherein the access point comprises:

a clock line configured to transmit a clock signal;

a first power supply configured to output a first voltage;

a second power supply configured to output a second voltage; and a modulator configured to receive the clock signal, the first voltage and the second voltage, and modulate the clock signal with the first voltage and the second voltage to be the modulated power.

3. The circuitry of claim 1, wherein the first throw and the fourth throw are connected to one of the demodulator and the sensor, and the first second throw and the third throw are connected to the other of the demodulator and the sensor.

4. The circuitry of claim 3, wherein the first RF cable is configured to transmit data signal, and the second RF cable is configured to transmit the modulated power, and wherein the first throw and the fourth throw are connected to the sensor, and the second throw and the third throw are connected to the demodulator.

5. The circuitry of claim 3, wherein the first RF cable is configured to transmit the modulated power, and the second RF cable is further configured to transmit data signal, and wherein the first throw and the fourth throw are connected to the demodulator, and the second throw and the third throw are connected to the sensor.

6. The circuitry of claim 1, wherein the circuitry further comprises a switch controller for controlling the first SPDT switch and the second SPDT switch such that upon determining that the cable to which the first antenna connection line is connected changes, the switch controller controls to change a respective throw to which the first input pole is connected, and a respective throw to which the second input pole is connected.

7. The circuitry of claim 6, wherein the switch controller comprises a comparator, and the comparator comprises:

a first input terminal connected to one of the first antenna connection line and the second antenna connection line so as to receive data signal or a modulated power;

a second input terminal connected to a reference voltage; and an output terminal connected to the first SPDT switch and the second SPDT.

8. The circuitry of claim 7, wherein the data signal has a voltage in a first range, and the modulated power has a voltage in a second range, and the first range is lower than the second range.

9. The circuitry of claim 1, wherein the first SPDT switch and the second SPDT switch are provided on a same chip.

10. The circuitry of claim 1, wherein the antenna module further comprises a Low Dropout Regulator (LDO) connected to both the first antenna connection line and the second antenna connection line to power the sensor.

11. An antenna circuitry, comprising:

a first antenna;

a second antenna; and a circuitry, comprising:

a first antenna connection line connected to the first antenna and one of a first radio frequency (RF) cable and a second RF cable;

a second antenna connection line connected to the second antenna and the other of the first RF cable and the second RF cable;

a first single pole double throw (SPDT) switch comprising a first input pole connected to the first antenna connection line, a first throw, and a second throw, wherein the first input pole is configured to be connected to the first throw upon determining that the first antenna connection line is connected to the first RF cable, and configured to be connected to the second throw upon determining that the first antenna connection line is connected to the second RF cable;

a second SPDT switch comprising a second input pole connected to the second antenna connection line, a third throw, and a fourth throw, wherein the second input pole is configured to be connected to the third throw upon determining that the second antenna connection line is connected to the second RF cable, and configured to be connected to the fourth throw upon determining that the second antenna connection line is connected to the first RF cable;

a demodulator configured to demodulate a modulated power from the access point into a demodulated clock signal; and a sensor configured to receive the demodulated clock signal to sense the first antenna and the second antenna.

12. The antenna module of claim 11, wherein the first RF cable and the second RF cable are connected between an access point and the antenna module, and the first throw and the fourth throw are connected to one of the demodulator and the sensor, and the first second throw and the third throw are connected to the other of the demodulator and the sensor.

13. The antenna module of claim 12, wherein the first RF cable is configured to transmit data signal, and the second RF cable is further configured to transmit the modulated power, and wherein the first throw and the fourth throw are connected to the sensor, and the second throw and the third throw are connected to the demodulator.

14. The antenna module of claim 11, wherein the circuitry further comprises a switch controller for controlling the first SPDT switch and the second SPDT switch such that upon determining that the cable to which the first antenna connection line is connected changes, the switch controller controls to change a respective throw to which the first input pole is connected, and a respective throw to which the second input pole is connected.

15. A system comprising:

an antenna module, comprising:

a first antenna;

a second antenna; and a circuitry, comprising:

a first antenna connection line connected to the first antenna and one of a first radio frequency (RF) cable and a second RF cable;

a second antenna connection line connected to the second antenna and the other of the first RF cable and the second RF cable;

a first single pole double throw (SPDT) switch comprising a first input pole connected to the first antenna connection line, a first throw, and a second throw, wherein the first input pole is configured to be connected to the first throw upon determining that the first antenna connection line is connected to the first RF cable, and configured to be connected to the second throw upon determining that the first antenna connection line is connected to the second RF cable; and a second SPDT switch comprising a second input pole connected to the second antenna connection line, a third throw, and a fourth throw, wherein the second input pole is configured to be connected to the third throw upon determining that the second antenna connection line is connected to the second RF cable, and configured to be connected to the fourth throw upon determining that the second antenna connection line is connected to the first RF cable;

an access point connected to the antenna module via the first RF cable and the second RF cable; and a switch controller for controlling the first SPDT switch and the second SPDT switch such that upon determining that the cable to which the first antenna connection line is connected changes, the switch controller controls to change a respective throw to which the first input pole is connected, and a respective throw to which the second input pole is connected.

16. The system of claim 15, wherein the antenna module further comprises:

a demodulator configured to demodulate a modulated power from the access point into a demodulated clock signal; and a sensor configured to receive the demodulated clock signal to sense the first antenna and the second antenna.

17. The system of claim 16, wherein the access point comprises:

a clock line configured to transmit a clock signal;

a first power supply configured to output a first voltage;

a second power supply configured to output a second voltage; and a modulator configured to receive the clock signal, the first voltage and the second voltage, and modulate the clock signal with the first voltage and the second voltage to be the modulated power.

* * * * *